United States Patent [19]
Beaty

[11] Patent Number: 6,003,262
[45] Date of Patent: Dec. 21, 1999

[54] PORTABLE FOUL BALL CATCHER

[76] Inventor: William Mark Beaty, 702 Squire Ct., Allen, Tex. 75002

[21] Appl. No.: 08/941,660

[22] Filed: Sep. 30, 1997

[51] Int. Cl.⁶ .................................................. A01K 77/00
[52] U.S. Cl. ................................................................ 43/12
[58] Field of Search ............................. 43/7, 11, 12, 134; D22/135; 210/470, 169; 446/487, 488

[56] References Cited

U.S. PATENT DOCUMENTS

| | | | |
|---|---|---|---|
| 985,114 | 2/1911 | Covell | 43/12 |
| 2,561,645 | 7/1951 | Bedford | 43/12 |
| 2,619,755 | 12/1952 | Henson | 43/12 |
| 2,630,646 | 3/1953 | Jensen | 43/12 |
| 2,653,404 | 9/1953 | Phaneuf | 43/12 |
| 4,050,177 | 9/1977 | Geritsen | 43/12 |
| 4,706,404 | 11/1987 | Kun | 43/12 |
| 5,501,026 | 3/1996 | Bryant et al. | 43/12 |
| 5,581,929 | 12/1996 | Molloy | 43/12 |

*Primary Examiner*—Kurt Rowan

[57] ABSTRACT

A retractable net device is provided including a housing with at least one segment slidably situated within the housing. A net is coupled to an end of the segment and has a stored orientation within the housing and an extended orientation situated exterior of the housing.

2 Claims, 2 Drawing Sheets

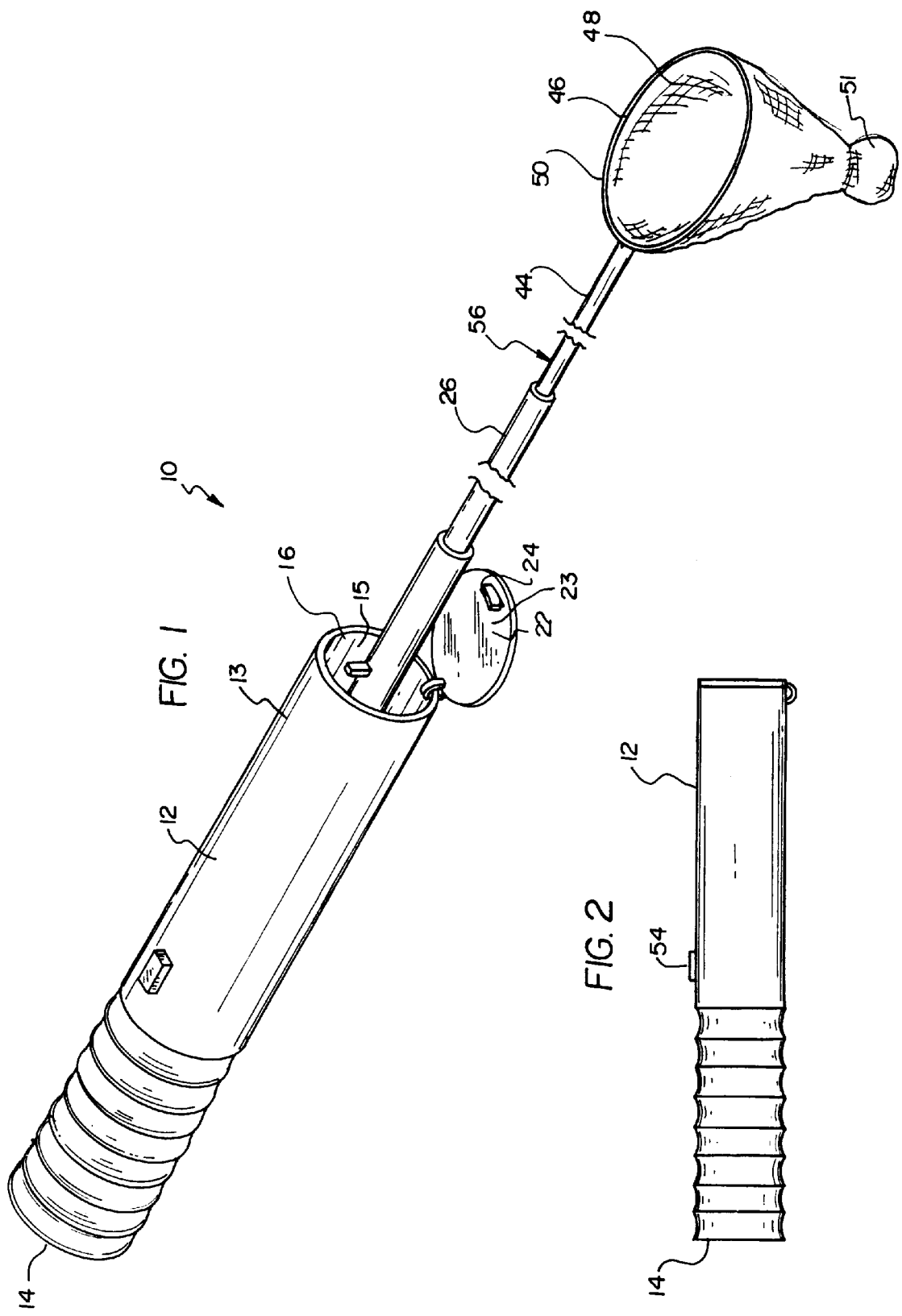

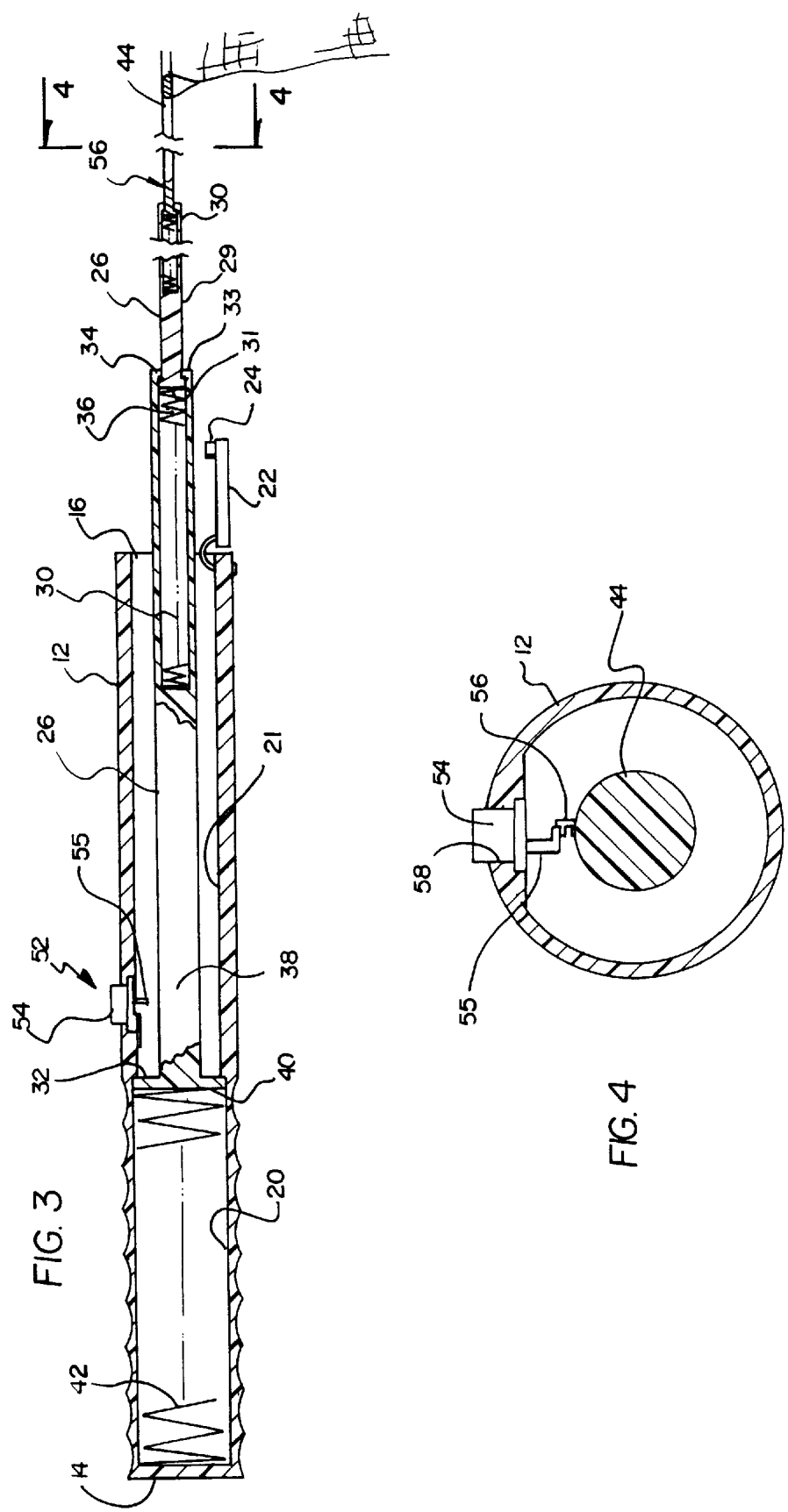

PORTABLE FOUL BALL CATCHER

BACKGROUND OF THE INVENTION

1. Field of the Invention

The present invention relates to fishing nets and more particularly pertains to a new portable foul ball catcher for providing an easily carried and stored means of catching foul balls at baseball and softball games.

2. Description of the Prior Art

The use of fishing nets is known in the prior art. More specifically, fishing nets heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing nets include U.S. Pat. No. 4,870,773; U.S. Pat. No. 4,138,790; U.S. Pat. No. Des. 319,681; U.S. Pat. No. 4,774,783; U.S. Pat. No. 4,207,700; and U.S. Pat. No. 4,272,906.

In these respects, the portable foul ball catcher according to the present invention substantially departs from the conventional concepts and designs of the prior art, and in so doing provides an apparatus primarily developed for the purpose of providing an easily carried and stored means of catching foul balls at baseball games.

SUMMARY OF THE INVENTION

In view of the foregoing disadvantages inherent in the known types of fishing nets now present in the prior art, the present invention provides a new portable foul ball catcher construction wherein the same can be utilized for providing an easily and carried stored means of catching foul balls at baseball games.

The general purpose of the present invention, which will be described subsequently in greater detail, is to provide a new portable foul ball catcher apparatus and method which has many of the advantages of the fishing nets mentioned heretofore and many novel features that result in a new portable foul ball catcher which is not anticipated, rendered obvious, suggested, or even implied by any of the prior art fishing nets, either alone or in any combination thereof.

To attain this, the present invention generally comprises a housing with a cylindrical configuration. Such housing has a closed end, an open end, an outer surface, and an inner surface. For defining a gripping handle, the outer surface is corrugated adjacent the closed end thereof. As shown in FIG. 3, the inner surface of the housing has an inboard portion with a first diameter and an outboard extent with a second diameter less than the first diameter. Further, the open end has a circular lid hingably coupled adjacent thereto. Such lid is equipped with a tab integrally coupled to an inner face thereof and extending therefrom. The tab thus serves to frictionally engage the inner surface of the housing to maintain the lid in a closed orientation. Next provided is a plurality of telescoping segments each with a cylindrical configuration. A first half of each telescoping segment is equipped with a closed end and a second half with a cylindrical compartment and an open end. The closed end of each segment has an outwardly extending annular flange coupled thereto and extending radially outwardly therefrom. Associated therewith is an inwardly extending annular flange coupled to the open end of each segment and extended radially inwardly therefrom. By this structure, the closed end of each segment is situated within the compartment of an adjacent segment with a spring therebetween. As such, each connected pair of segments has an unbiased extended orientation with the inwardly and outwardly extending flanges abutting and a biased retracted orientation. As shown in FIG. 3, an inboard segment has the outwardly extending flange thereof slidably situated within the inboard portion of the housing. A spring is situated between the closed end of the housing and the closed end of the inboard segment. Shown in FIGS. 1, 3 & 4 is an outboard segment including a collapsible O-ring coupled thereto in coplanar relationship therewith. A net is provided which has an open top with a periphery coupled to the O-ring. FIG. 1 shows the net having an elastic ring integrally coupled above a bottom thereof for defining a pouch. Finally, a release mechanism is provided including a push button slidably situated within a bore formed in the outboard portion of the housing. As best shown in FIG. 4, the push button has a L-shaped tab integrally coupled to a bottom surface thereof. The release mechanism further includes an inverted L-shaped tab integrally coupled to the outboard segment. During use, the segments each may be situated within the housing in the biased retracted orientation thereof and the lid closed. In such orientation, an upper extent of the inverted L-shaped tab engages a lower extent of the L-shaped tab when the push button is in an unbiased orientation, thereby maintaining the segments and net within the housing. Upon the depression of the push button, however, the net exits the housing and regains a circular configuration.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new portable foul ball catcher apparatus and method which has many of the advantages of the fishing nets mentioned heretofore and many novel features that result in a new portable foul ball catcher which is not anticipated, rendered obvious, suggested, or even implied by any of the prior art fishing nets, either alone or in any combination thereof.

It is another object of the present invention to provide a new portable foul ball catcher which may be easily and efficiently manufactured and marketed.

It is a further object of the present invention to provide a new portable foul ball catcher which is of a durable and reliable construction.

An even further object of the present invention is to provide a new portable foul ball catcher which is susceptible of a low cost of manufacture with regard to both materials and labor, and which accordingly is then susceptible of low prices of sale to the consuming public, thereby making such portable foul ball catcher economically available to the buying public.

Still yet another object of the present invention is to provide a new portable foul ball catcher which provides in the apparatuses and methods of the prior art some of the advantages thereof, while simultaneously overcoming some of the disadvantages normally associated therewith.

Still yet another object of the present invention is to provide a new portable foul ball catcher for providing an easily carried and stored means of catching foul balls at baseball games.

Even still another object of the present invention is to provide a new portable foul ball catcher that includes a housing with at least one segment slidably situated within the housing. A net is coupled to an end of the segment and has a stored orientation within the housing and an extended orientation situated exterior of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new portable foul ball catcher according to the present invention.

FIG. 2 is a side view of the present invention with the segments and net in the retracted orientation.

FIG. 3 is a cross-sectional view of the present invention.

FIG. 4 is a cross-sectional view of the present invention taken along line 4—4 shown in FIG. 3.

DESCRIPTION OF THE PREFERRED EMBODIMENT

With reference now to the drawings, and in particular to FIGS. 1 through 4 thereof, a new portable foul ball catcher embodying the principles and concepts of the present invention and generally designated by the reference numeral 10 will be described.

As shown in the various Figures, the present invention, as designated as numeral 10, includes a housing 12 with a cylindrical configuration. Such housing has a closed end 14, an open end 16, an outer surface 13, and an inner surface 15. For defining a gripping handle, the outer surface is corrugated adjacent the closed end thereof to form a corrugated gripping surface 60. As shown in FIG. 3, the inner surface of the housing has an inboard portion 20 with a first inner diameter and an outboard extent 21 with a second inner diameter less than the first diameter.

Further, the open end has a circular lid 22 hingably coupled adjacent thereto via a small ring. Such lid is equipped with a tab 24 integrally coupled to an inner face 23 thereof and extending therefrom. The tab serves to frictionally engage the inner surface of the housing to maintain the lid in a closed orientation. It should be understood that for reasons that will become apparent later, the lid may be opened merely by the application of force to the inner surface thereof.

Next provided is a plurality of telescoping segments 26 each with a cylindrical configuration. Each segment has a different diameter. A first half 29 of each telescoping segment is equipped with a closed end 31 and a second half 30 with a cylindrical compartment and an open end 33. The closed end of each segment has an outwardly extending annular flange 32 coupled thereto and extending radially outwardly therefrom. Associated therewith is an inwardly extending annular flange 34 coupled to the open end of each segment and extended radially inwardly therefrom. By this structure, the closed end of each segment is situated within the compartment of an adjacent segment with a coil spring 36 therebetween. It should be noted that the springs have different diameters commensurate with the diameters of the associated segment. As such, each connected pair of segments has an unbiased extended orientation with the inwardly and outwardly extending flanges abutting and a biased retracted orientation.

As shown in FIG. 3, an inboard segment 38 has the outwardly extending flange 40 thereof slidably situated within the inboard portion of the housing. A spring 42 is situated between the closed end of the housing and the closed end of the inboard segments.

Shown in FIGS. 1, 3 & 4 is an outboard segment 44 including a collapsible O-ring 46 coupled thereto in coplanar relationship therewith. A nylon net 48 is provided which has an open top with a periphery coupled to the O-ring. The collapsible nature of the O-ring allows the same to be stored in the housing which is a smaller diameter. FIG. 1 shows the net having an elastic ring 50 integrally coupled above a bottom thereof for defining a pouch 51. Such pouch is preferably the size of a baseball or softball. As such, when the net and segments are extended, the net is ideally constructed for the purpose of catching foul balls at a baseball game.

Finally, a release mechanism 52 is provided including a push button 54 slidably situated within a bore 58 formed in the outboard portion of the housing. Ideally, the push button has a portion thereof integrally coupled to an inner surface of the housing for ensuring that the button remains in the bore and further is capable of being depressed. As best shown in FIG. 4, the push button has an L-shaped tab 55 integrally coupled to a bottom surface thereof. The release mechanism further includes an inverted L-shaped tab 56 integrally coupled to the outboard segment.

During use, the segments each may be situated within the housing in the biased retracted orientation thereof and the lid closed. In such orientation, an upper extent of the inverted L-shaped tab engages a lower extent of the L-shaped tab when the push button is in an unbiased orientation, thereby maintaining the segments and net within the housing. Note FIG. 4. Upon the depression of the push button, however, the net exits the housing and regains a circular configuration.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baseball catching device comprising, in combination:
    a housing with a cylindrical configuration including a closed end, an open end, an outer surface, and an inner surface, the outer surface being corrugated adjacent the closed end thereof for defining a gripping handle, the inner surface having an inboard portion with a first diameter and an outboard extent with a second diameter less than the first diameter, the open end having a circular lid hingably coupled adjacent thereto with the lid having a tab integrally coupled to an inner face thereof and extending therefrom for frictionally engaging the inner surface of the housing to maintain the lid in a closed orientation;
    a plurality of telescoping segments each with a cylindrical configuration having a first half with a closed end and a second half with a cylindrical compartment and an open end, the closed end having an outwardly extending annular flange coupled thereto and extending radially outwardly therefrom and the open end has an inwardly extending annular flange coupled thereto and extending radially inwardly therefrom, whereby the closed end of each segment is situated within the compartment of an adjacent segment with a spring therebetween, each connected pair of segments thereby having an unbiased extended orientation with the inwardly and outwardly extending flanges abutting and a biased retracted orientation, the segments including an inboard segment and an outboard segment;
    said inboard segment having the outwardly extending flange thereof slidably situated within the inboard portion of the housing with a spring situated between the closed end of the housing and the closed end of the inboard segment;
    said outboard segment including a collapsible O-ring coupled thereto in coplanar relationship therewith;
    a net having an open top with a periphery coupled to the O-ring, the net having an elastic ring integrally coupled above a bottom thereof for defining a pouch; and
    a release mechanism including a push button slidably situated within a bore formed in the outboard portion of the housing, the push button having a L-shaped tab integrally coupled to a bottom surface thereof, the release mechanism further including an inverted L-shaped tab integrally coupled to the outboard segment, whereby the segments each may be situated within the housing in the biased retracted orientation thereof and the lid closed such that an upper extent of the inverted L-shaped tab engages a lower extent of the L-shaped tab when the push button is in an unbiased orientation wherein the tabs disengage upon the depression of the push button thereby allowing the net to exit the housing and regain a circular configuration.

2. A retractable net device comprising:
    a housing including a closed end, an open end, an outer surface, and an inner surface, the outer surface being corrugated adjacent the closed end thereof for defining a gripping handle, the inner surface having an inboard portion with a first diameter and an outboard extent with a second diameter less than the first diameter, the open end having a lid hingably coupled to the housing adjacent to the open end, the lid having a tab integrally coupled to an inner surface thereof and extending from the inner face for frictionally engaging the inner surface of the housing to maintain the lid in a closed orientation;
    a plurality of telescoping segments each having a first half with a closed end and a second half with a compartment and an open end, the closed end having a first annular flange coupled thereto, the first annular flange extending radially outwardly from the closed end, the open end having a second annular flange coupled thereto, the second annular flange extending radially inwardly therefrom, the closed end of each segment being situated in the compartment of an adjacent segment with a spring therebetween, each connected pair of segments having an unbiased extended orientation with the inwardly and outwardly extending flanges abutting, and a biased retracted orientation, the segments including an inboard segment and an outboard segment;
    said inboard segment having the first annular flange thereof slidably situated in the inboard portion of the housing with a spring situated between the closed end of the housing and the closed end of the inboard segment;
    said outboard segment including a collapsible O-ring coupled to the outboard segment in coplanar relationship therewith;
    a net having an open top with a periphery coupled to the O-ring, the net having an elastic ring integrally coupled above a bottom thereof for defining a pouch, the net being coupled to an end of the segment and having a stored orientation within the housing and an extended orientation situated exterior of the housing, the net having an elastic ring integrally coupled above a bottom thereof for defining a pouch; and
    a release mechanism including a bottom slidably situated in a bore formed in the outboard portion of the housing, the push button having a L-shaped tab integrally coupled to a bottom surface thereof, the release mechanism further including an inverted L-shaped tab integrally coupled to the outboard segment, whereby the segments each may be situated within the housing in the biased retracted orientation thereof and the lid closed such that an upper extent of the inverted L-shaped tab engages a lower extent of the L-shaped tab when the button is in an unbiased orientation wherein the tabs disengage upon the depression of the push button thereby allowing the net to exit the housing and regain a circular configuration.

* * * * *